United States Patent [19]

Ellis et al.

[11] Patent Number: 4,884,864
[45] Date of Patent: Dec. 5, 1989

[54] PIN AND SOCKET FIBER OPTIC CONNECTOR

[75] Inventors: Roger H. Ellis, Atherton; A. Christian Walton; Akira Tomita, both of Redwood City, all of Calif.

[73] Assignee: Raychem Corp., Menlo Park, Calif.

[21] Appl. No.: 132,493

[22] Filed: Dec. 14, 1987

Related U.S. Application Data

[63] Continuation-in-part of Ser. No. 29,840, Mar. 24, 1987, abandoned, and a continuation-in-part of Ser. No. 99,941, Sep. 23, 1987, abandoned.

[51] Int. Cl.$^4$ .................................................. G02B 6/38
[52] U.S. Cl. .................................................. 350/96.21
[58] Field of Search ................ 350/96.20, 96.21, 96.22

[56] References Cited

U.S. PATENT DOCUMENTS

| | | | |
|---|---|---|---|
| 4,178,068 | 12/1979 | Hoover | 350/96.21 |
| 4,205,898 | 6/1980 | Matthews et al. | 350/96.20 |
| 4,255,016 | 3/1981 | Borsuk | 350/96.20 |
| 4,726,647 | 2/1988 | Kakii et al. | 350/96.21 |
| 4,735,480 | 4/1988 | Levinson | 350/96.21 |
| 4,737,009 | 4/1988 | Kakii et al. | 350/96.21 |

FOREIGN PATENT DOCUMENTS 2136595 9/1984 United Kingdom .

*Primary Examiner*—William L. Sikes
*Assistant Examiner*—Robert E. Wise
*Attorney, Agent, or Firm*—Dennis E. Kovach; Herbert G. Burkard

[57] ABSTRACT

A fiber optic connector which includes a connector body having at least one socket cavity therein and a socket contact inserted into the socket contact cavity. The socket contact has a retention area and a cable termination area at one end and a retractable contact portion at the other end. The connector further includes means on the retractable contact portion for limiting axial movement of the contact portion so that when the contact portion is unretracted, a tip of the contact portion is substantially flush with a surface of the connector body.

16 Claims, 8 Drawing Sheets

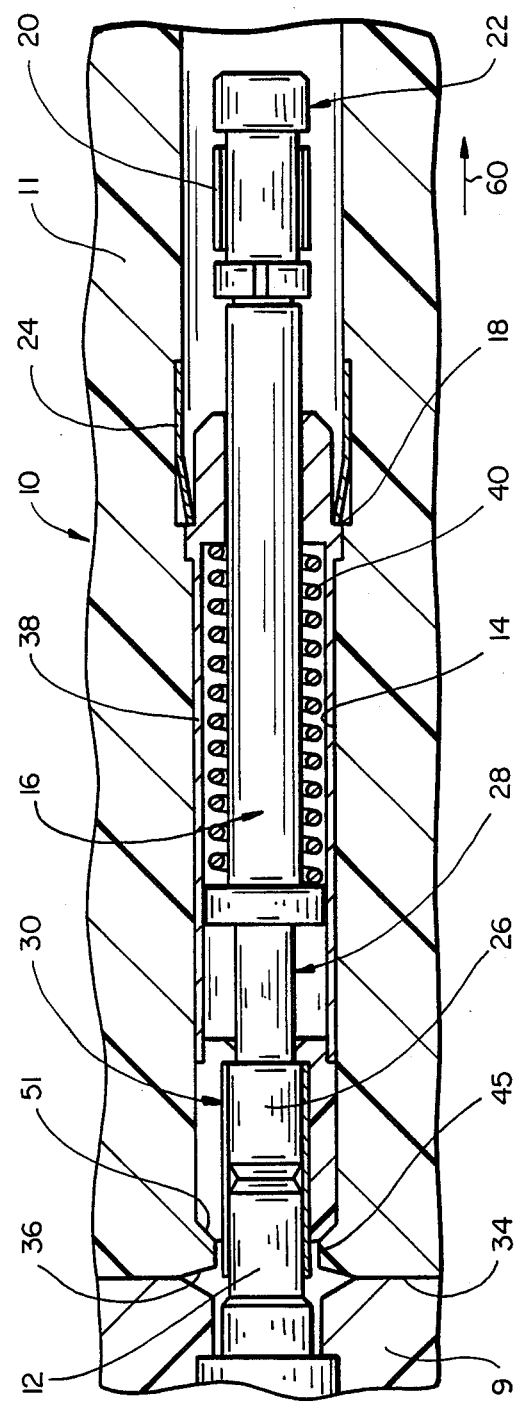
FIG_1

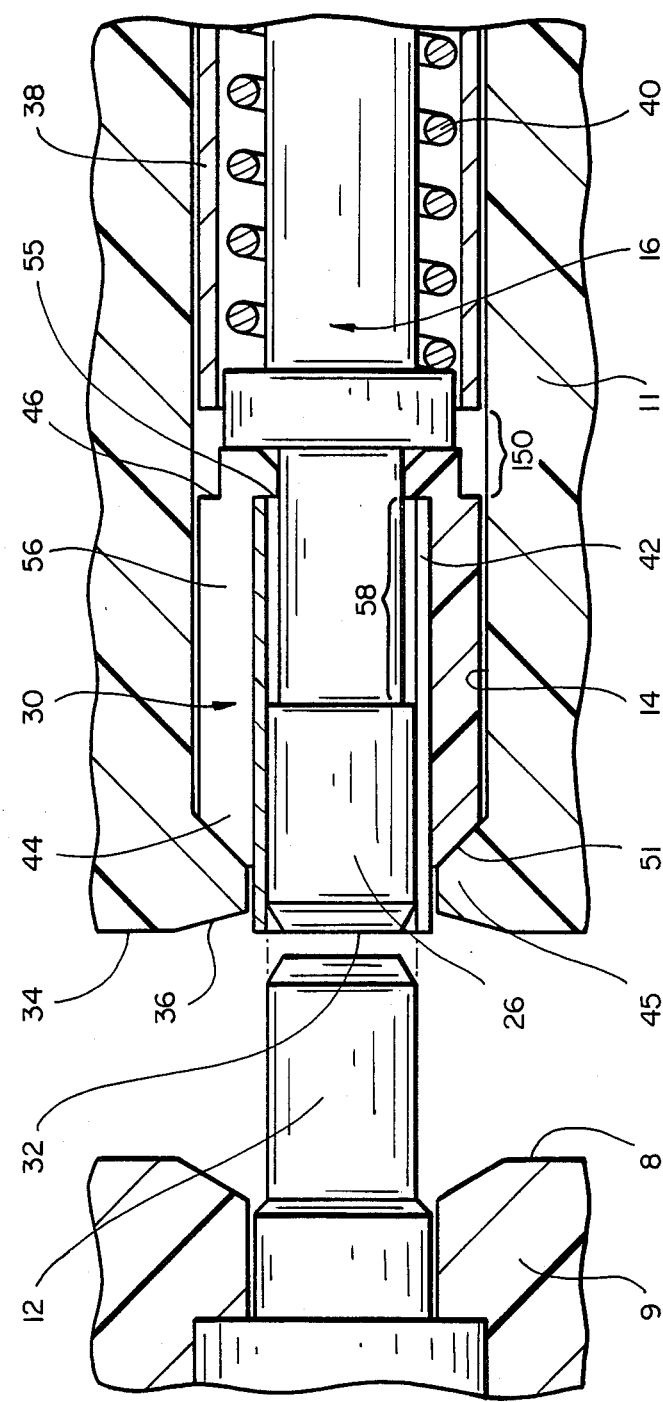
FIG_2

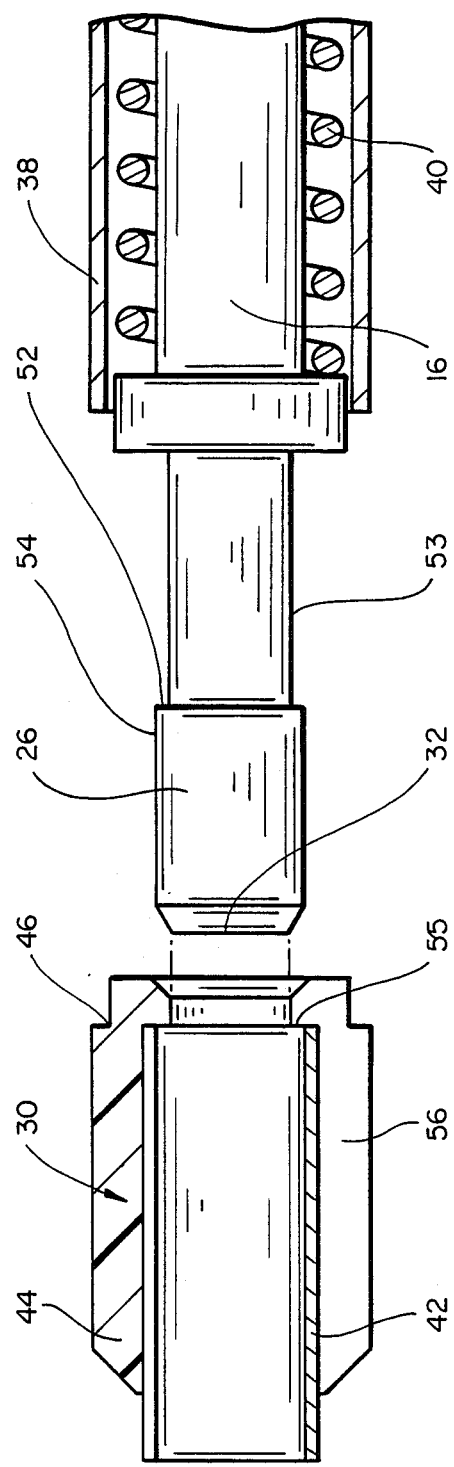
FIG_3

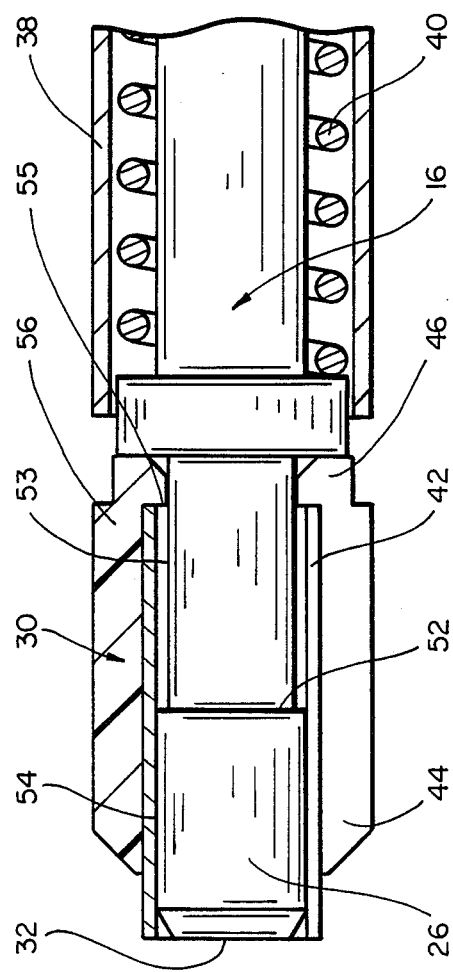
FIG_4

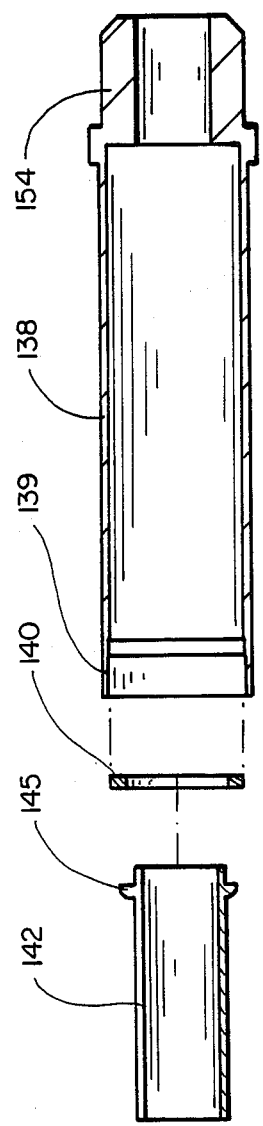
FIG_5
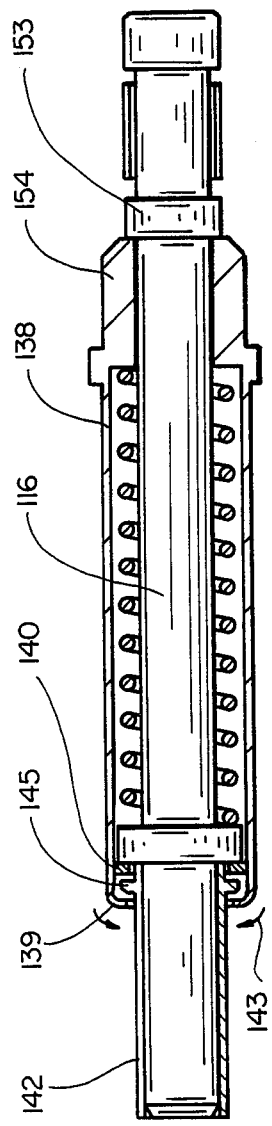
FIG_6

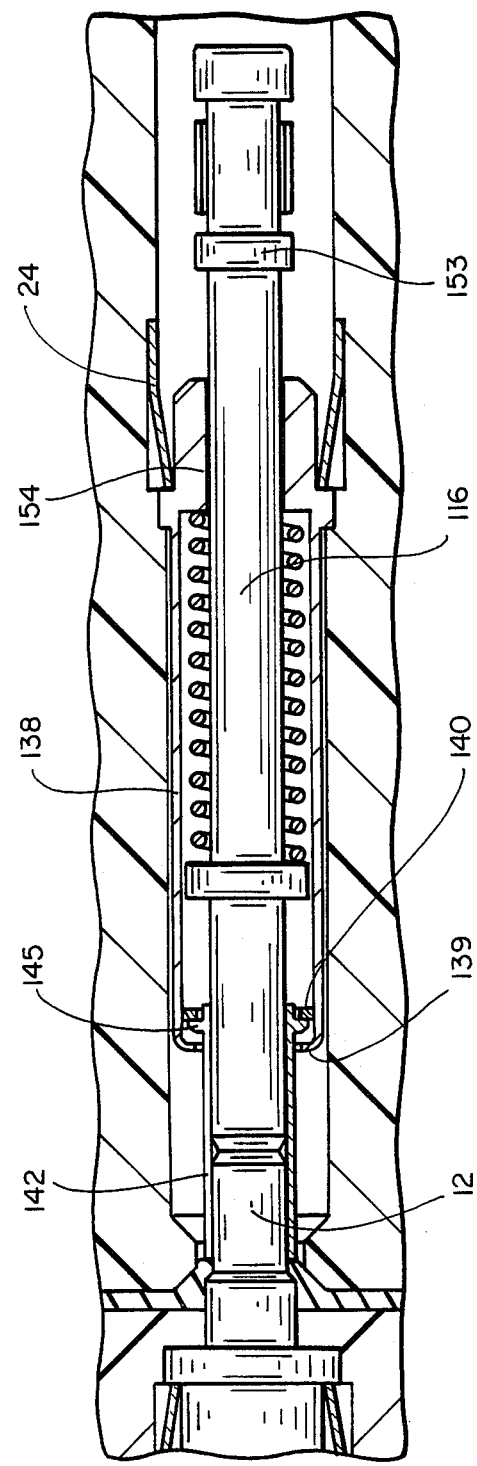
FIG_8

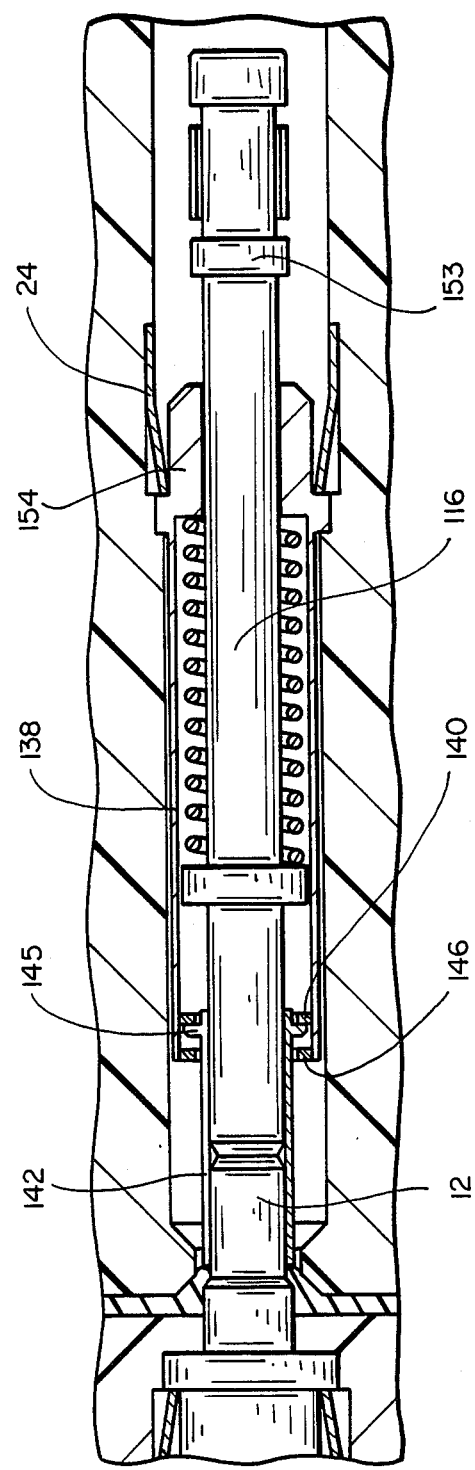
FIG_9

4,884,864

PIN AND SOCKET FIBER OPTIC CONNECTOR

CROSS-REFERENCE TO RELATED APPLICATION

The present application is a continuation-in-part of U.S. application Ser. No. 029,840, filed Mar. 24, 1987, and U.S. application Ser. No. 099,941 filed Sept. 23, 1987, both assigned to the assignee of the invention, now abandoned, the disclosures of which are incorporated herein by reference.

FIELD OF THE INVENTION

This invention relates to the field of fiber optic connectors and more particularly to the field of fiber optic connectors having pin and socket contacts.

BACKGROUND OF THE INVENTION

In the transition from copper wires to optical fibers it has been desirable to terminate the optical fibers in a standard electrical connector housing.

Hoover U.S. Pat. No. 4,178,068 discusses a fiber optic cable termination means which may be utilized in a standard open entry electrical connector housing. However, a problem with the Hoover connector is that the socket contact protrudes beyond the socket contact cavity which will expose the socket contact to damage from accidental contact with tools, misaligned connectors, etc. The Hoover termination means is not desirable for use with connectors having a closed entry.

Matthews et al. U.S. Pat. No. 4,205,898 and U.K. Patent No. 2,136,595B discloses other means for aligning fiber optic cables.

A requirement of fiber optic connectors is that after every demating, it is desirable to clean the end of the optical fiber. This is not possible with most contacts presently used in closed entry fiber optic connectors unless the socket contact is removed from the socket contact cavity and the entire socket disassembled, a very tedious process. Of course, this problem is somewhat obviated with open entry socket contact cavity designs, such as the Hoover connector, although the additional problem of damage to the socket contact would now be present.

Accordingly, it is an object of the invention to have a fiber optic connector wherein disassembly of the connector is unnecessary for cleaning of the optical fiber end.

It is another object of the invention to have a fiber optic connector wherein damage to the socket contact is avoided when the connector is unmated or not in use.

It is another object of the invention to provide a fiber optic socket contact that can be used in a closed entry type connector body and be substantially flush with the socket contact cavity, and be removable from the contact cavity along with an alignment sleeve to be used therewith.

It is yet another object of the invention to replace the standard electrical contacts with fiber optic contacts without changing the contact cavity, thereby making them interchangeable.

These and other objects of the invention will become more apparent after referring to the following description considered in conjunction with the accompanying drawings.

SUMMARY OF THE INVENTION

The objects of the invention have been achieved by providing a fiber optic connector which comprises a connector body having at least one socket cavity therein and a socket contact inserted into the socket contact cavity. The socket contact has a retention area and a cable termination area at one end and a retractable contact portion at the other end. The connector further comprises means on the retractable contact portion for limiting axial movement of the contact portion so that when the contact portion is unretracted, a tip of the contact portion is substantially flush with a surface of the connector body, the limiting means being easily removable from the socket contact cavity along with the socket contact.

BRIEF DESCRIPTION OF THE DRAWINGS

FIG. 1 is a cross-sectional view of an assembled connector according to the invention.

FIG. 2 is an enlarged partial cross-sectional view of the retractable contact portion of a socket contact shown in FIG. 1 demated from its contact pin.

FIGS. 3 and 4 illustrate the retractable contact portion and a limiting means in both an unassembled and assembled state, respectively.

FIGS. 5,6,7, and 8 illustrate a further embodiment of the invention in various stages of assembly, and FIG. 9 illustrates yet another embodiment of the invention in a fully assembled state.

DESCRIPTION OF THE PREFERRED EMBODIMENTS

Figure 7:
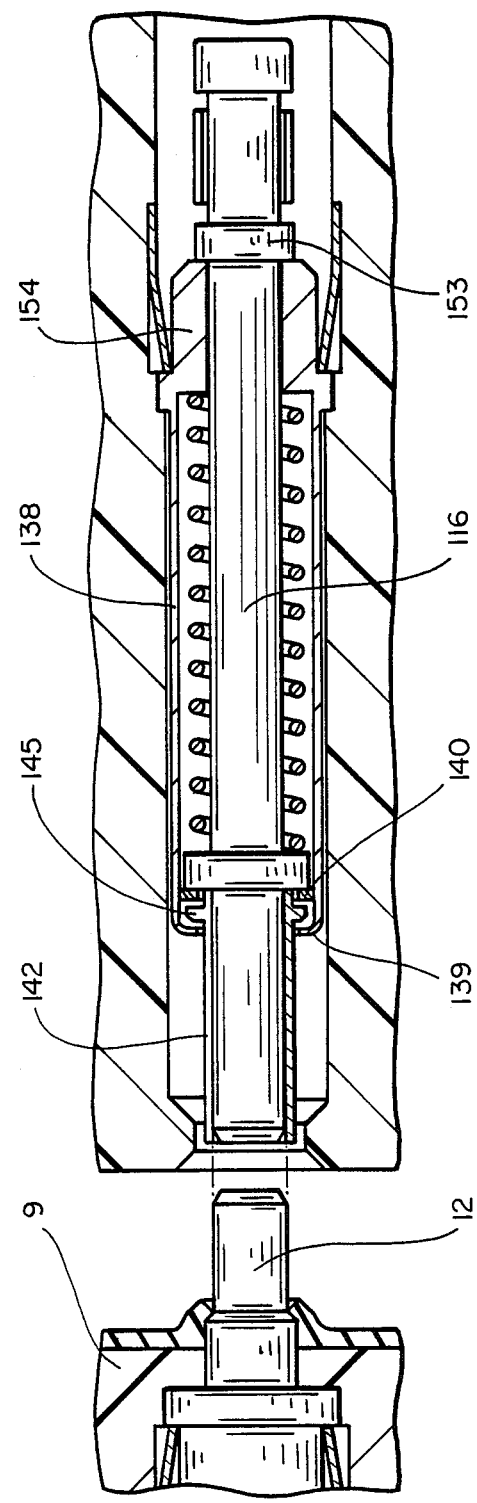

According to the invention there is disclosed a fiber optic connector comprising a connector body having at least one socket contact cavity therein and a socket contact inserted into the socket contact cavity. The socket contact has a retention area and a cable termination area at one end and a retractable contact portion at the other end. The connector further comprises means on the retractable contact portion for limiting axial movement of the contact portion so that when the contact portion is unretracted, a tip of the contact portion is substantially flush with a surface of the connector body, the connector being designed such that the limiting means is retained on the contact portion when the socket contact is removed from the socket contact cavity.

Referring to the Figures in more detail, and particularly referring to FIG. 1, there is shown a fiber optic connector 10 which is a socket connector in its assembled state with a connection pin 12. The pin 12 enters the connector 10 from the left, the pin being attached to a mating connector (not shown) which includes a contact body 9. Together connector 10 and pin 12 and its mating connector make up a mating pin and socket connector.

For clarity, a terminated optical fiber and a fiber optic cable are not shown in the Figures associated with the connector 10 or mating connector although it should be understood that, in use, such are present, a first optical fiber having an end of its core centered on an end of retractable contact portion 26, a second optical fiber having an end of its core centered on an end of the pin 12.

The connector 10 comprises a connector body 11 (sometimes also called a socket insert) having at least one socket contact cavity 14 therein. The present invention is especially suited for closed entry socket contact cavities. The closed entry socket contact cavity 14 has shoulder portion 45 to provide alignment for mating electrical pin contacts when placed in the same cavity. The shoulder portion 45 provides for crude alignment of the pin 12 and socket contact 16 when inserting the pin 12 into the body 11, with more precise alignment being obtained from other components, as more fully described below. The connector body 11 is usually made from a mass of insulating materials.

The connector 10 further comprises the socket contact 16 which is inserted into the socket contact cavity 14 at the opening defined by the shoulder portion 45. The socket contact 16 has a retention area 18 and a cable termination area 20 at one end 22 of the socket contact. As can be appreciated from FIG. 1, the socket contact shown therein is a rear insertion contact. The contact 16 is retained in position by retention tines 24 subsequent to being inserted from the right. The socket contact further comprises the retractable contact portion 26 at an opposite front end 28 of the socket contact 16, spring 40, and barrel 38.

The connector further comprises means, generally indicated by 30, on the retractable contact portion 26 for limiting forward axial movement of the retractable contact portion 26 so that when the contact portion is unretracted, as shown in FIG. 2, a tip 32 of the contact portion is substantially flush with a first surface 34 of the connector body 11. The means 30 preferably also axially aligns the pin 12 with the contact portion 26. By "substantially flush" it is meant that the front surface 34 and the front of the tip 32 are aligned so as to be within 2 or 3 mm of one another, preferably within 2 mm of one another, more preferably within 1 mm of one another, most preferably any misalignment being such that the tip 32 is slightly recessed within the connector body rather than protruding therefrom to minimize the risk of accidental damage occurring to the tip when in an unconnected state.

As shown in FIG. 1, the connector body 11 further has a chamber 36. Preferably the tip 32 of the contact portion 26 should extend no further inwardly than on innermost section of the chamber 36. The reason for this preference is so that the optical fiber end may be cleaned without disassembling the socket contact from the socket contact cavity. And yet, the optical fiber end is accessible without the socket contact being susceptible to damage as is possible, for example, in the Hoover patent discussed in the Background of the Invention.

It is most preferred that the limiting means 30 aligns the retractable contact portion 26 and the mating contact pin 12. Thus, it can be appreciated that the limiting means 30 on the one hand allows the optical fiber to be substantially flush with a surface 34 of the connector body prior to optical connection and on the other hand aligns the contact portion 26 and mating contact pin 12 subsequent to optical connection.

Referring now to FIG. 2 the retractable contact portion 26 is shown in much greater detail. It can be seen that the retractable contact portion 26 is retractable vi cooperation between the socket contact barrel 38 and socket contact spring 40. When a pin contact 12 is exerted upon the end 32 of the contact portion 26 the contact portion 26 retracts within the socket contact barrel 38. The inward movement of the contact portion 26 is limited by the force exerted by the socket contact spring 40. When the pin contact is removed, the spring 40 pushes the retractable contact portion 26 back out so that the tip 32 of the contact portion 26 is flush with the surface 34 of the connector body 11 due to engagement between boss 44 of limiting means 30 and surface 51 of the contact body.

The limiting means 30 is preferably a tubular sleeve 42 which is snugly fitted onto the retractable contact portion 26. The limiting means 30 has the boss 44 on its periphery proximate to the tip 32 of the contact portion, and a boss 46 on its opposite periphery so that there is a boss at both ends of the means 30. In use, boss 44 limits axial movement of the contact portion 26 to the left (outwardly) by engaging against the surface 51 of the shoulder portion 45 of the connector body 11.

FIGS. 3 and 4 show further details of the contact portion 26 and the limiting means 30. The contact portion 26 preferably has a boss 52 along an intermediate circumferential section thereof such that the contact portion has first and second different sized adjacent diameter sections 53, 54, respectively. In addition, the limiting means 30 includes an additional boss 55 which is capable of engaging the contact portion boss 52. According to a preferred embodiment, the limiting means 30 is constructed by forming a tubular metallic spring 42. A molded plastic casing 56 includes the bosses 44, 46, 55 and is attached to the spring 42.

The limiting means 30 and contact portion 26 are assembled by sliding engagement as indicated by arrow 57 in FIG. 3 whereby the boss 55 is temporarily compressed and deformed by the larger contact portion section 54, the boss 55 substantially expanding to its normal shape upon reaching the smaller contact portion section 53, as illustrated in FIG. 4. A distance 58 (FIG. 2) between the boss 55 of the casing 56 and the boss 52 of the contact portion 26 upon assembly is sufficiently long such that contact therebetween does not occur when the pin 16 is fully inserted into the socket contact cavity 14, as illustrated in FIG. 1.

To remove the socket contact 16 from the connector body, a hollow tool (not shown) is inserted into a rear end (from the right in FIG. 1) of the connector body. The tool expands the tines 24 outwardly so as to clear the retention area 18 with the tool compressionly engaging the socket contact 16 and abutting against the retention area 18. Accordingly, the tool when removed from the connector body also removes the socket contact 16 therefrom. Another significant advantage of the invention is that whenever the socket contact 16 including its barrel 38 and spring 40 is so removed from the socket contact cavity 14 by sliding the contact 16 rearwardly relative to the cavity 14 (in the direction of arrow 60 in FIG. 1) by using the tool as explained, to disengage retention tines 24, engagement between the casing boss 55 and the contact portion boss 52 causes the limiting means 30 to be removed with the contact 16 rather than being retained within the cavity 14 by frictional forces. Accordingly the limiting means, which is relatively tiny in size, is positively retained with the contact in position on its contact portion for ease of reassembly.

To assemble the connector so described, the limiting means 30 is slid onto the socket contact portion 26 as illustrated by comparing FIGS. 3 and 4, and the socket contact 16 is then inserted into a rear of the socket contact cavity 14 until the tines 24 engage the contact retention area 18. In this state, the tip 32 of the retractable contact portion 26 is substantially flush with the surface 34 of the contact body 11, as illustrated in FIG. 2. Thereafter, the pin 12 is engaged with the tip 32 of the retention contact portion 26 and urged into the socket contact cavity 14. As a comparison of FIGS. 1 and 2 illustrates, the retractable contact portion 26 is caused to move rearwardly against the force of the spring 40, and the limiting means 30 initially moves rearwardly with the retractable contact portion 26 due to frictional engagement therebetween. Movement of the limiting means 30 continues until the casing boss 46 engages the fixed arrow 38. Thereafter, further pin insertion causes the retractable contact portion to move rearwardly relative to both the limiting means and the contact body 11 until a contact body 9 of the pin 12 contacts the contact body surface 34. The distance between an end of the pin 12 and an end 8 of its contact body 9 is such that it is approximately one-half a total length of the limiting means 30 and less than the length 58 between the casing boss 55 and the contact portion boss 52 prior to pin insertion which allows the pin 12 and the retractable contact portion 26 to be approximately centered within the limiting means sleeve 42 and aligned thereby.

It is most preferred that the tubular sleeve 42 is axially split. This allows for ease of manufacturing of the sleeve and also for maintaining a tight grip on the contact portion 26 and the pin 12 by the sleeve 42 and accurate alignment thereof. The material of the sleeve 42 is relatively unimportant just so long as the sleeve is strong enough to perform its intended aligning and limiting functions and yet is readily formable to its shape as shown in the Figures. It is expected that a material such as beryllium copper will satisfy the purposes of the invention.

FIGS. 5-8 illustrate a further embodiment of the invention, FIG. 5 illustrating part of the connector in an unassembled state, FIG. 6 illustrating part of the connector in a partially assembled state, FIG. 7 illustrating the connector in its final assembled state unmated with a pin 12, and FIG. 8 illustrates the connector in its mated state with the mating contact pin 12.

Referring to FIG. 5, the socket contact includes a barrel 138 having a front end 139 which is thinner in cross-section than a remainder thereof. A ring 140 is press fit within an interior of the barrel 138, preferably just rear of the thin section 139 of the barrel, as illustrated in FIG. 6, and subsequently the sleeve 142 is snugly disposed around a front portion of the retractable contact portion, as illustrated in FIG. 6. Thereafter, the thin section 139 of the barrel 138 is rolled as illustrated by arrows 143 so as to captivate a sleeve boss 145 formed on a rear part of the sleeve 142. In this manner, the sleeve is positively retained with the barrel 138, with the retractable contact portion 116 being moveable relative to both the barrel 138 and the sleeve 142. Accordingly, by comparing FIGS. 7 and 8 which show the connector in its unmated and mated condition, respectively, it is readily apparent the alignment sleeve 142 readily allows alignment between the mating contact pin 12 and the retractable contact portion 116. Since the sleeve boss 145 is allowed to move a slight distance longitudinally relative to the ring 140 and the rolled barrel section 139, the retention sleeve 142 can move in any angle so as to positively align the pin 12 and retractable contact portion 116 even when their respective longitudinal axis are not exactly coincident.

FIG. 9 illustrates a further embodiment of the invention, the embodiment of FIG. 9 being substantially similar to that of FIGS. 5-8 except that a second ring 146 is utilized in place of the rolled barrel section 139 so as to positively retain the alignment sleeve 142.

The embodiments of FIGS. 5-9 are advantageous since with such constructions it is not possible for the tines 24 to snap back down onto any part of the alignment sleeve structure when removing the socket contact from the connection body with the tool previously described as could possibly happen due to gap 150 which exists between the contact barrel and casing 56 in FIG. 2. Accordingly, the embodiments of FIGS. 5-9 positively allow all parts of the socket contact to be removed outside the contact cavity without the risk of any part of the alignment sleeve mechanism being inadvertently retained within the connector body.

In the embodiments of FIGS. 5-9, forward axial movement limit of the socket contact is limited by a rear boss 153 (FIG. 9) formed on the retractable contact portion 116, the boss 153 contacting a rear section 154 of the barrel 138 when a frontmost face of the retractable contact portion is substantially flush with a front face of the connector body, as previously explained.

While the present invention is particularly useful for fiber optic connectors, it nevertheless may have applicability to electrical connectors as well. Accordingly, the invention has been discussed primarily in the context of fiber optic connectors. It should be understood, however, that the use of the present invention for electrical connectors is also contemplated within the scope of the invention.

It will be apparent to those skilled in the art having regard to this disclosure that other modifications of this invention beyond those embodiments specifically described here may be made without departing from the spirit of the invention. Accordingly, such modifications are considered within the scope of the invention as limited solely by the appended claims.

What is claimed is:

1. A fiber optic connector, comprising:
   a connector body having at least one socket contact cavity therein;
   a socket contact inserted into said contact cavity, said socket contact having a retention area at one end and a retractable contact portion; and
   means for limiting axial movement of said contact portion so that when said contact portion is unretracted a tip of said contact portion is substantially flush with a front surface of the connector body so as to be within 3 mm thereof, said limiting means being constructed so as to align front ends of said retractable contact portion and a mating contact pin.

2. The connector of claim 1, said limiting means comprising a tubular sleeve snugly fitted onto said retractable contact portion.

3. The connector of claim 2, said sleeve being axially split.

4. The connector of claim 2, said limiting means including a first boss located on a rear of said sleeve and a second boss located rearwardly of said retention area.

5. The connector of claim 4, said socket contact further comprising a socket contact barrel on which is formed said retention area, said barrel having a rear surface for engaging said second boss when said contact portion is unretracted such that said tip of said contact portion is substantially flush with the front surface of the connector body so as to be within 3 mm thereof.

6. The connector of claim 5, said socket contact further including second means connected to said barrel for limiting both forward and rearward movement of said tubular sleeve relative to said barrel.

7. The connector of claim 6, said second limiting means including at least one press fit ring.

8. The connector of claim 7, said second limiting means further including a second press fit ring.

9. The connector of claim 7, said second limiting means further including a front section of the barrel which has been rolled such that said first boss is captivated between said ring and the rolled barrel so as to allow a small amount of movement therebetween.

10. The connector of claim 1, said limiting means comprising a tubular sleeve snugly fitted onto said retractable contact portion, said limiting means having a boss on its periphery at both ends of said sleeve.

11. The connector of claim 1, said sleeve being axially split, said limiting means including a first boss on its rear periphery, said retractable contact portion having first and second adjacent different sized diameter sections and a boss therebetween, the retractable contact portion boss being engageable with the first boss upon removal of the socket contact from the connector body rearwardly.

12. The connector of claim 11, said sleeve being tubular and being snugly fitted onto a front diameter section of the retractable contact portion, and said limiting means further including a casing which has formed thereon the first boss and second and third bosses, said second and third bosses being at opposite ends of said casing for limiting axial movement of the limiting means in both a forward and a rearward direction.

13. The connector of claim 1, a tip of said contact Portion being within 2 mm of a front surface of the connector body.

14. The connector of claim 1, a tip of said contact portion being within 1 mm of a front surface of the connector body.

15. The connector of claim 1, the limiting means being located on the retractable contact portion in an area behind the retention area.

16. The connector of claim 1, the limiting means being located on the retractable contact portion in an area in front of the retention area.

* * * * *